US008318299B2

(12) United States Patent
Harris

(10) Patent No.: US 8,318,299 B2
(45) Date of Patent: Nov. 27, 2012

(54) FIRE RESISTANCE FOR OPTICALLY TRANSPARENT THERMOPLASTICS

(75) Inventor: John N Harris, Seattle, WA (US)

(73) Assignee: The Boeing Company, Chicago, IL (US)

( * ) Notice: Subject to any disclaimer, the term of this patent is extended or adjusted under 35 U.S.C. 154(b) by 299 days.

(21) Appl. No.: 11/777,349

(22) Filed: Jul. 13, 2007

(65) Prior Publication Data

US 2007/0254148 A1    Nov. 1, 2007

Related U.S. Application Data

(62) Division of application No. 11/159,609, filed on Jun. 23, 2005, now Pat. No. 7,790,088.

(51) Int. Cl.
*B32B 5/16* (2006.01)
(52) U.S. Cl. .................. 428/323; 244/129.2; 244/129.3
(58) Field of Classification Search ............... 244/129.3, 244/129.2; 428/323
See application file for complete search history.

(56) References Cited

U.S. PATENT DOCUMENTS

| 4,255,367 A * | 3/1981 | Wallace et al. ............... 264/45.1 |
| 5,039,566 A | 8/1991 | Skubic et al. |
| 5,552,459 A | 9/1996 | Polk, Jr. et al. |
| 5,665,450 A | 9/1997 | Day et al. |
| 6,900,547 B2 | 5/2005 | Polk Jr. et al. |
| 2004/0238690 A1 * | 12/2004 | Wood et al. ................. 244/129.3 |
| 2005/0167641 A1 * | 8/2005 | Chen et al. .................... 252/604 |

FOREIGN PATENT DOCUMENTS

KR    2002021522 A  *  3/2002

OTHER PUBLICATIONS

Brunelle, Encyclopedia of Polymer Scinece and Technology—Polycarbonates Article, 2005, John Wiley & Sons, Inc., pp. 1-33.*
U.S. Department of Transportation, Federal Aviation Administration, Fire-Safe Polymers and Polymer Composites, Sep. 2004, p. 1-85.
Gao, Bo, et al. Alloy Formation in Nanostructured Silicon, Adv. Mater., Jun. 5, 2001, vol. 13 No. 11, p. 816-819.
National Science and Technology Council Committee on Technology, The Interagency Working Group on NanoScience, Engineering & Technology, Nanostructure Science and Technology—A Worldwide Study, Sep. 1999, Chapter 2, available at http://wtec.org/loyola/nano/02_04.htm.
Beyer, Gunter. Nanocomposites as a New Class of Flame Retardants, Wire & Cable Technology International, Sep. 2003.

(Continued)

*Primary Examiner* — Elizabeth A Robinson
(74) *Attorney, Agent, or Firm* — Harness, Dickey & Pierce, P.L.C.

(57) ABSTRACT

A fire retardant, transparent panel and method of making the panel, that is especially well suited for use on mobile platforms, and particularly on aircrafts. The panel is a composite of a transparent matrix and a plurality of fire-retardant nanoparticles. The nanoparticles have a diameter less than the visible spectrum of light, and in one form between about 0.1 nm to about 400 nm in diameter. The nanoparticles may be arranged randomly or in predetermined patterns within the matrix during manufacturing of the panel. The panel is lightweight, transparent and yet highly fire retardant.

5 Claims, 2 Drawing Sheets

OTHER PUBLICATIONS

Walter, Matthew D., et al. Overview of Flame Retardants Including Magnesium Hydroxide, available at http://www.magspecialties.com/magshield-overview.htm.

Huber Engineered Materials, Ingredients for Plastics & Thermoplastics, available at http://www.hubermaterials.com/167.htm.

Business Communications Company, DFI97 Flame Retardant Industry Review, Introduction and Table of Contents, Jul. 1998, available at http://www.bccresearch.com/chem/DF197.html.

ChemTec Publishing, Flame Retardants for Plastics, available at http://www.chemtec.org/books/rap/rap-156.html.

Boedeker Plastics, Fire Safe Plastic Materials, available at http://www.boedecker.com/firesafe.htm.

van Esch, Dr. G. J. United Nationas Environment Programme, International Labour Organisation, & World Health Organization; Environmental Health Criteria 192-Flame Retardants: A General Introduction, 1997, available at http://www.inchem.org/documents/ehc/ehc/ehc192.htm.

* cited by examiner

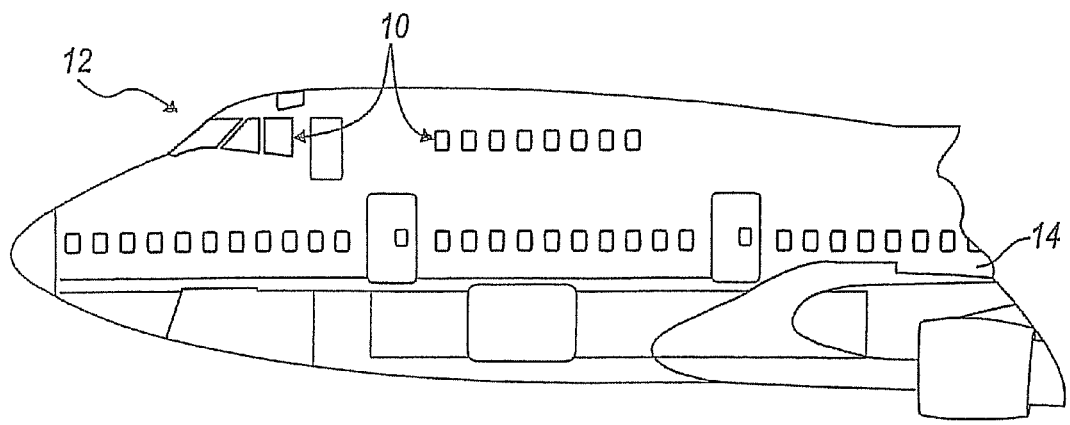
FIG. 1
FIG. 2
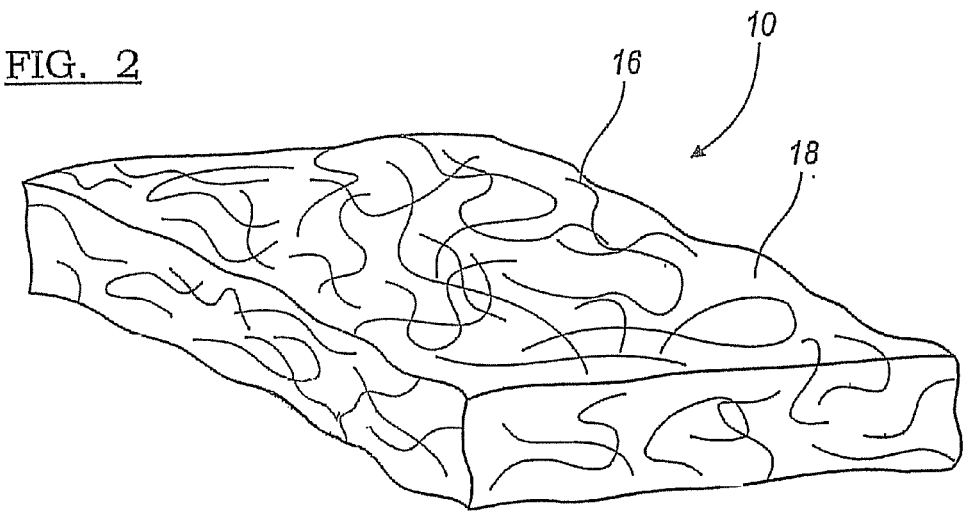
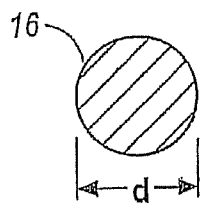
FIG. 2A

FIRE RESISTANCE FOR OPTICALLY TRANSPARENT THERMOPLASTICS

CROSS-REFERENCE TO RELATED APPLICATION

This application is a divisional of U.S. patent application Ser. No. 11/159,609 filed on Jun. 23, 2005, now U.S. Pat. No. 7,790,088, the disclosure of which is incorporated herein by reference.

FIELD

The present invention relates to composite transparencies and more particularly to composite transparencies utilized to provide improved fire resistance for optically transparent thermoplastics that can be incorporated into a mobile platform.

BACKGROUND

Fire safety is important because of the destructive nature of an uncontrolled fire. Fire is a self-propagating cycle of reactions where matter changes form as indicated by the visible and tangible side effects of heat, light, and gas emission. Fire is caused by raising a fuel (such as plastic or wood, for example) to its combustion temperature. The heat decomposes the complex molecules of the fuel into smaller molecules that recombine with oxygen in the air to produce different fuels, generate more heat, and release various gases. The burning fuel releases free radicals that emit light or produce a flame. The fuel decomposition and radical emission contribute to the fire cycle until only the nearly pure carbonaceous base of the fuel, known as char, remains. The fire is accompanied by the release of volatile gas compounds, or smoke, from the fuel components that do not char. As long as there is a source of oxygen, free radicals, and fuel, the fire will continue and may become uncontrollable.

Technologies such as flame retardants and flame resistant materials, for example, have been developed to control fire by raising the combustion temperature, reducing the rate of burning, reducing flame propagation, and reducing smoke generation. Flame retardants include inorganic minerals, phosphorous compounds, halogenated organic compounds, and others for the inclusion in various fuels or substrates. The inorganic minerals reduce heat generated to below the combustion temperature of the fuel by endothermically decomposing and releasing water vapor upon decomposition. The phosphorous compounds stop fire by expediting charring of the outer layers of the fuel to insulate any remaining fuel from burning and to prevent the release of combustible gases. The halogenated organic compounds stop fire by eliminating the free radicals that contribute to the combustion process.

Choosing a flame retardant may be based on the desired mechanism of protection or may be based on non-fire related criteria as demonstrated in the transportation industry where the multiple safety variables are considered in order to best protect equipment and/or passengers. In mobile platforms such as aircrafts, trains, buses, or ships that are operator driven, it is necessary that visibility through transparencies of the mobile platform such as windows does not interfere with the visual range needed to safely maneuver the mobile platform. When selecting flame retardants for the transparency, particular care must be used because upon combustion of transparency polymers, the initial polymer material burns to undergo crosslinking, aromatization, fusion of aromatics, polymer chain scission, polymer chain stripping, and the like. These changes in polymer structure prolong the burning, provide innumerable fuel sources, increase flame propagation, and increase the generation of toxic gases.

Current methods of preventing fire and enhancing fire resistance of transparencies have included incorporating phosphorous and halogenated organic compounds into the transparency material, for example, by applying coatings of the materials onto the transparencies. Despite the benefits, the phosphorous and halogenated organic compounds produce corrosive smoke and/or various environmentally detrimental and toxic emissions. Furthermore, the coated transparencies have a different refraction index (RI) than the uncoated transparency material causing light bending and image distorting through the coated transparency or cause clouding and opacity of the transparent material.

Accordingly, there is still a need for a fire-resistant transparency that can provide fire resistance, reduce flame spreading, reduce the rate of heat release, facilitate extinction of the fire, minimize smoke evolution, and does not distort the refractive index of the transparency or impair the visibility through the transparency. The present invention is illustrated in connection with an aircraft window, however it is applicable to any transparency where fire resistance and undistorted visibility are of paramount importance.

SUMMARY

In various embodiments, the present invention provides a fire-retardant transparent panel comprising a transparent matrix and a plurality of fire-retardant nanoparticles integrated within the transparent matrix. The fire-retardant nanoparticles have a diameter less than the wavelength of visible light. The fire-retardant nanoparticles can be in particulate form or various types of fibers. In preferred embodiments, the fire-retardant nanoparticles are endothermic materials or dehydrators, or are independently selected from alumina trihydrate, magnesium hydroxide, calcium carbonate, ferrocene, and combinations thereof.

Methods for providing a fire-retardant transparent panel are also provided. The methods generally comprise providing a transparent matrix, providing a plurality of fire-retardant nanoparticles having a diameter less than the wavelength of visible light, and integrating the fire-retardant nanoparticles within the transparent matrix such that the panel is substantially insensitive to a difference between the refractive index of the transparent matrix and a refractive index of the fire-retardant nanoparticles. The arrangement of the fire-retardant nanoparticles in the transparent matrix can be selected to enhance the overall fire-retardant properties of the panel and/or to minimize impacts of the nanoparticles on visibility.

An aircraft having a fire-retardant window is also provided. The aircraft generally comprises a fuselage having an opening. A window is placed in the opening. The window comprises a transparent panel and a plurality of fire-retardant nanoparticles having a diameter less than the wavelength of visible light.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 1 is an illustration of an exemplary mobile platform including a fire-retardant transparent panel according to various embodiments of the present invention;

FIG. 2 is a sectional view of the fire-resistant transparent panel shown in FIG. 1;

FIG. 2A is a simplified end cross-sectional view of one of the fire-retardant nano-particles illustrating its diameter as being "d";

DETAILED DESCRIPTION OF THE PREFERRED EMBODIMENTS

Figure 3A:
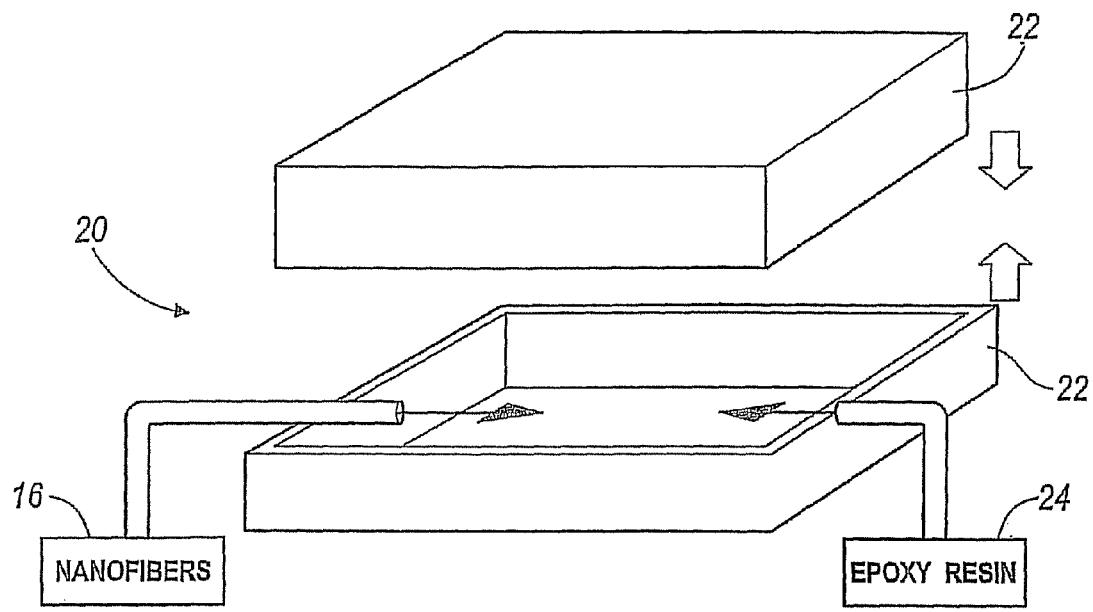
FIG. 3A is a schematic view of an injection mold used to construct the fire-retardant transparent panel, shown in FIG. 1, in accordance with various embodiments of the present invention.

The following description of the preferred embodiment(s) is merely exemplary in nature and is in no way intended to limit the invention, its application, or uses.

Referring to FIG. 1, a fire-retardant transparent panel 10 according to various embodiments of the present invention is depicted in operative association with a mobile platform 12. In various embodiments, the mobile platform 12 is an aircraft. Although the mobile platform 12 is shown as an aircraft, the mobile platform 12 could also be represented in the form of other mobile platforms, including, but not limited to a ship, a train, a bus, or an automobile. Additionally, although various embodiments of the present invention will be described below as particularly applicable for use in association with mobile platforms, the invention should not be so limited in application. It is envisioned that the invention is equally applicable to aircrafts, trains, buses, ships, buildings, masks, respirators, goggles, or any application where a fire-retardant panel having high transparency and uninterrupted visibility is of paramount importance.

In the particular example provided, the fire-retardant transparent panel 10 is shown as a window in an opening in a fuselage 14 of the mobile platform 12. It should be appreciated, however, that the fire-retardant transparent panel 10 can be used in any interior or exterior portion of the mobile platform 12, and may include the cockpit window or a door window. Moreover, the fire-retardant transparent panel 10 can be used in any number of environments not strictly limited to conventional "windows". For example, skylights, running light covers, satellite dome covers, view ports, and various other environments can employ the fire-retardant transparent panel 10 of the present invention.

FIG. 2 illustrates a portion of the fire-retardant transparent panel 10. The fire-retardant transparent panel 10 generally includes a plurality of fire-retardant nanoparticles 16 integrated within a transparent matrix 18. In a preferred form, the transparent matrix 18 is formed from polycarbonate, a transparent epoxy resin, or polyvinyl fluoride. Any suitable polymeric material may also be used for the transparent matrix 18 including, but not limited to thermoplastics.

The fire-retardant nanoparticles 16 are materials that reduce the spread of fire or prevent fire. Exemplary fire-retardant materials include, but are not limited to, alumina trihydrate, magnesium hydroxide, calcium carbonate, ferrocene, and combinations thereof. The fire-retardant nanoparticles 16 may be any other suitable material. For example, endothermic materials or materials that absorb heat generated by the surroundings or dehydrators that remove sources of oxygen from a burning system may be employed. Suitable fire-retardant materials also include various transition metals. The fire-retardant materials should be selected based on the desired level of heat control, the relative amount of the fire-retardant material for incorporation in the transparent matrix 18, the end use of the fire-retardant transparent panel 10, and any structural and physical limitations of the system into which the fire-retardant transparent panel 10 is incorporated. While not intending to be bound by a particular theory, it is believed that select fire-retardant nanoparticles 16 reduce fire by endothermic means such that when the fire-retardant material combusts, it absorbs heat from the surroundings, thereby reducing the temperature of the fire. After a succession of these endothermic reactions, the fire becomes extinguished as the combustion temperature of the fuel cannot be maintained by the burning system.

Although the fire-retardant nanoparticles 16 are depicted as individual fibers, the fire-retardant nanoparticles 16 can be of any suitable shape including particles, continuous fibers, chopped fibers, bundled fibers, intertwined fibers, and combinations thereof. In embodiments utilizing bundled fibers or weaved fibers, or fibers where there is overlap, it is understood that the total thickness of the overlapped regions is to not exceed the wavelength of light as to prevent any interference with visibility due to light scattering or refraction from the fibers.

The fire-retardant nanoparticles 16 can also be a mixture of fibers and particles. The integration of the fire-retardant nanoparticles 16 can be tailored to extinguish the fire in a distinct pattern or a time frame. For example, a dense region of fire-retardant particles can be placed on the outer surfaces of the transparent panel 10 while a single continuous fiber loops the core of the transparent panel. The dense region of particles could cause the surface of the fire-retardant transparent panel 10 to char to quickly block the remaining fuel source and stop the spread of fire. In other embodiments, dense regions could be used to isolate the fire. For example, strips of the fire-retardant transparent panel 10 could have a dense population of the fire-retardant nanoparticles 16 such that the fire is blockaded and cannot spread to other regions of the fire-retardant transparent panel 10.

In one preferred embodiment, the fire-retardant nanoparticles are in fiber form and comprise alumina trihydrate. The alumina trihydrate is prepared using a solution synthesis or a precipitation method. An aluminum source, such as aluminum sulfate, is combined with a solution that provides the requisite oxidation of the aluminum sulfate and/or provides the hydrating component until the aluminum oxide trihydrate or alumina trihydrate begins to precipitate from the solution. The solids can be removed to stop precipitation. Increasing the length of time the precipitate remains in the solution leads to a greater diameter of the nanofiber or particulate or a longer nanofiber, depending on the agitation of the system and other reaction controls such as temperature. Additional synthesis techniques include laser induced dehydroxylation of $Al(OH)_4^-$ to $Al(OH)_3$, hydrolysis of $Al(CH_3)_3$ in a turbulent subsonic gas jet reactor, sonochemical processing, microemulsion processing, high-energy ball milling, or any other techniques known in the art used to produce nanoparticulates.

The dependence of light scattering upon particles in a coating can be described by the following relationship:

$$I_s \alpha (Nd^6/\lambda^4)(\Delta n)^2,$$

where N is the total number of nanoparticles, d is the diameter of the nanoparticles or nanoparticle aggregates, $\lambda$ is the wavelength of light that is incident upon a coating with the nanoparticles, and $\Delta n$ is the difference in the index of refraction of the nanoparticles and the transparent matrix. In a preferred embodiment the diameter "d" of the fire-retardant nanoparticles 16 is less than the wavelength of visible light, i.e., less than from about 400 nm to about 600 nm: Preferably, the fire-retardant nanoparticles 16 have a diameter d, as shown in FIG. 2a, of from about 0.1 nm to about 400 nm, and more preferably from about 1 nm to about 5 nm. In embodiments where the fire-retardant nanoparticles 16 are in fiber form, the fibers can range from about 10 nm in length to about 500 nm in length. The small diameter insures that any light absorbed by the alumina trihydrate will be in the ultraviolet range and therefore invisible to the human eye.

Preferably the fire-retardant nanoparticles 16 are distributed within the transparent matrix 18 at from about 1% by volume to 60% by volume, and more preferably from about 20% by volume to about 40% by volume.

In accordance with one preferred implementation of the present invention, due to the diameter d being less than the wavelength of visible light, the fire-retardant nanoparticles 16 provide an uninterrupted view. The transmittance is on the order of at least 90% and preferably at least about 95%. Moreover, because the light absorption of the fire-retardant nanoparticles 16 is in the ultraviolet range and not visible to the human eye, it is possible to allow dissimilar RIs between the fire-retardant nanoparticles 16, such as the white pigment alumina trihydrate, and the transparent matrix 18, such as polycarbonate, without the fire-retardant transparent panel 10 becoming opaque.

In an exemplary implementation, the fire-retardant nanoparticles 16 are integrated with the transparent matrix 18 utilizing an injection molding process as illustrated in FIG. 3A. A mold 20 generally includes mold halves 22 that combine to form a designated shape, such as, for example, a window shape. The epoxy resin 24 and fire-retardant nanoparticles 16 are then injected into the mold 20. The fluid flow of the epoxy resin 24 can be varied to direct mixing and direction of the nanoparticles 16. In an alternate preferred embodiment, not depicted, the inlets for the epoxy resin 24 and the fire-retardant nanoparticles 16 can be on the same side of the mold half 22. A cycle of higher and slower flow rates of the epoxy resin 24 can also be implemented to achieve proper mixing of the epoxy resin 24 and the fire-retardant nanoparticles 16 or to selectively deposit the fire-retardant nanoparticles 16 across the panel 10. It is understood that the epoxy resin 24 and the fire-retardant nanoparticles 16 may be mixed prior to disposition of the mixture into the mold half 22 or after the components are placed in the mold half 22. Once the epoxy resin 24 has set or cured, the fire-retardant transparent panel 10 may then be removed from the mold 20. It is possible for the mold 20 to take on any shape desired, thereby allowing windows that have complex surfaces.

Figure 3B:
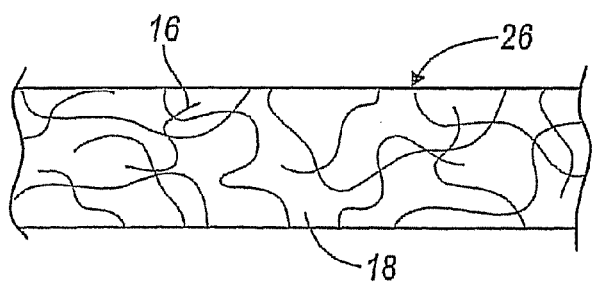
FIG. 3B is a schematic view of a fire-retardant nanoparticle pre-impregnated tape used to construct the fire-retardant transparent panel, shown in FIG. 1, in accordance with various embodiments of the present invention.

Turning to FIG. 3B, in an alternative preferred embodiment, the fire-retardant nanoparticles 16 are used to form a reinforced pre-impregnated tape. For example, the fire-retardant nanoparticles 16 may be arranged in a resin that, after solidification, forms the transparent matrix 18 in the form of strips of pre-impregnated tape 26. Successive layers of the pre-impregnated tape 26 may then be laminated to form the fire-retardant transparent panel 10. Due to the random orientation of the fire-retardant nanoparticles 16 on the pre-impregnated tape 26 of various embodiments, the pre-impregnated tape 26 may not need to be aligned in any particular manner when laminated with layers of other pre-impregnated tape 26 to form the fire-retardant transparent panel 10.

Figure 3C:
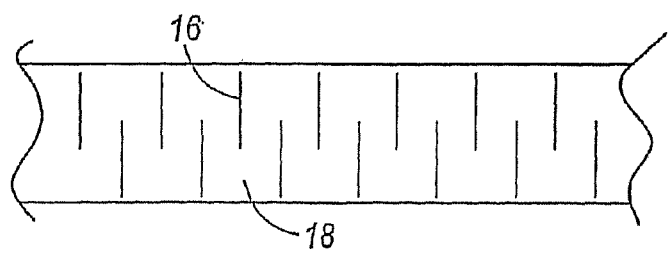
FIG. 3C is a sectional view of a fire-retardant transparent panel according to various embodiments of the present invention.

In addition to the random orientation of the injection molding, the integration of the fire-retardant nanoparticles 16 can also be in an ordered form such as lined patterns, such as strips or grids, regular shaped patterns, such as circles, rectangles, squares, or ellipses, irregular shaped patterns or free-form patterns, overlapping patterns, such as an interconnected series of circles, weaved patterns, such as cloth, and various combinations thereof. As depicted in FIG. 3C, the fire-retardant nanoparticles 16 are arranged in a substantially linear pattern. The linear pattern may be achieved by forming a laminate of the transparent matrix 18 and the nanoparticles 16. The pressure and directional force resultant from the laminate process can be manipulated to align the nanoparticles 16 in rows. In various embodiments, pultrusion techniques that generally include pulling a fiber reinforced resin through a shaping die, can be used to orient the fire-retardant nanoparticles 16 and provide the desired linear or regular shaped pattern.

Regardless of the particular technique employed, it is desirable that the implementation of the fire-retardant nanoparticles 16 be performed to prevent clumping or undesired aggregation of the fibers. In various embodiments, it may be desirable to integrate the fire-retardant nanoparticulates 16 in a manner to provide dense regions or a gradient of the fire-retardant nanoparticles 16.

By employing fire-retardant nanoparticles 16 having a diameter less than the wavelength of light integrated within a transparent matrix 18, the fire-retardant transparent panel 10 is substantially insensitive to RI 'mismatch', e.g. 'mismatch' caused by the integration of materials having different refractive indices. This surprising result is especially beneficial because some fire-retardant materials are actually pigments, such as the white coloring of alumina trihydrate. The fire-retardant nanoparticles 16 prevent light scattering and refraction that occurs from particles that can deflect light. That is, the fire-retardant transparent panel 10 will maintain a high level of transparency, e.g. 90% or greater, in the presence of the fire-retardant nanoparticles 16. Moreover, the fire-retardant transparent panel 10 has an increased hardness which can be useful in the mobile platform 12.

Preferably, the fire-retardant nanoparticles 16 are incorporated into the fire-retardant transparent panel in an amount sufficient to provide at least one of flame spread reduction, heat reduction, smoke reduction, rapid charring, and safety to the panel and its surroundings. The concentration of the fire-retardant nanoparticles incorporated can be altered based on the end use of the fire-retardant transparent panel, for example, maximizing the concentration of flame-retardant nanoparticles 16 to provide flame resistance to distinct regions of the fire-retardant transparent panel 10 where the flame may be able to propagate more as compared to other regions.

While various preferred embodiments have been described, those skilled in the art will recognize modifications or variations, which might be made without departing from the inventive concept. The examples illustrate the invention and are not intended to limit it. Therefore, the description and claims should be interpreted liberally with only such limitation as is necessary in view of the pertinent prior art.

What is claimed is:

1. An aircraft comprising:
 a fuselage having an opening;
 a fire-retardant window positioned in the opening, the window including:
  a transparent matrix; and
  a plurality of fire-retardant fibers each having a length of between 10 nm and 500 nm integrated within the transparent matrix, the fire-retardant fibers each having a diameter less than about 600 nm; and
 the fire-retardant window having the plurality of fire-retardant fibers distributed at outer surface areas thereof, and at a single continuous looping fiber disposed at a core area thereof.

2. The aircraft of claim 1, wherein the transparent matrix is selected from the group consisting of polycarbonate, an epoxy resin, and polyvinyl fluoride.

3. The aircraft of claim 1, wherein the fire-retardant fibers comprise one of: continuous fibers, chopped fibers, bundled fibers, intertwined fibers, or combinations thereof.

4. The aircraft of claim 1, wherein the fire-retardant fibers comprise a material selected from the group consisting of endothermic materials, dehydrators, and combinations thereof.

5. The aircraft of claim 1, wherein the fire-retardant fibers are selected from the group consisting of alumina trihydrate, magnesium hydroxide, calcium carbonate, ferrocene, and combinations thereof.

* * * * *